(12) United States Patent
Kim et al.

(10) Patent No.: US 11,023,059 B2
(45) Date of Patent: Jun. 1, 2021

(54) TOUCH DISPLAY PANEL AND TOUCH DISPLAY DEVICE

(71) Applicant: LG Display Co., Ltd., Seoul (KR)

(72) Inventors: HoonBae Kim, Seoul (KR); CheolSe Kim, Daegu (KR); SeungMok Shin, Daegu (KR); JuHan Kim, Gyeonggi-do (KR); YongChan Park, Seoul (KR); HyunHo Park, Gyeongsangbuk-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/124,998

(22) Filed: Sep. 7, 2018

(65) Prior Publication Data

US 2019/0079623 A1   Mar. 14, 2019

(30) Foreign Application Priority Data

Sep. 8, 2017  (KR) .................. 10-2017-0115303
Jul. 13, 2018  (KR) .................. 10-2018-0081639

(51) Int. Cl.
| | |
|---|---|
| *G06F 3/041* | (2006.01) |
| *G06F 3/047* | (2006.01) |
| *G09G 3/20* | (2006.01) |
| *G06F 3/044* | (2006.01) |
| *G02F 1/1333* | (2006.01) |
| *G02F 1/136* | (2006.01) |

(52) U.S. Cl.
CPC .......... *G06F 3/0412* (2013.01); *G06F 3/047* (2013.01); *G06F 3/0443* (2019.05); *G06F 3/04164* (2019.05); *G09G 3/2096* (2013.01); *G02F 1/13338* (2013.01); *G02F 1/13606* (2021.01); *G02F 2201/123* (2013.01); *G06F 2203/04107* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2017/0017327 A1* | 1/2017 | Chang | G06F 3/0412 |
| 2017/0212626 A1* | 7/2017 | Zhao | G02F 1/1368 |
| 2017/0371464 A1* | 12/2017 | Nakanishi | G06F 3/0412 |

* cited by examiner

*Primary Examiner* — Parul H Gupta
(74) *Attorney, Agent, or Firm* — Seed IP Law Group LLP

(57) ABSTRACT

Embodiments disclosed herein relate to a touch display panel and a touch display device. By arranging a shielding structure, which is connected to a touch electrode in a region where a touch line and a data line overlap each other or is applied with a shielding signal corresponding to a touch driving signal from an outside circuit, between the touch line and the data line, it is possible to prevent direct capacitance from being formed between the touch line and the data line, and to prevent the capacitance formed due to the data line from causing noise on a touch sensing signal. In addition, by arranging a touch load reduction layer between the shielding structure and the touch line, it is also possible to reduce the capacitance between the touch line and the data line arranged in the horizontal direction, thereby improving touch sensing performance.

20 Claims, 16 Drawing Sheets

TOUCH DISPLAY PANEL AND TOUCH DISPLAY DEVICE

CROSS REFERENCE TO RELATED APPLICATIONS

This application claims priority from Korean Patent Application No. 10-2017-0115303, filed Sep. 8, 2017, and Korean Patent Application No. 10-2018-0081639, filed Jul. 13, 2018, which is hereby incorporated by reference for all purposes as if fully set forth herein.

BACKGROUND

Technical Field

Embodiments disclosed herein relate to a touch display panel and a touch display device.

Description of the Related Art

As society has developed into an information-based society, demand for a display device for displaying images is increasing, and various types of display devices such as a liquid crystal display, a plasma display, and an organic light-emitting display are being utilized.

In order to provide more various functions, such display devices provide functions of recognizing a user's touch on a display panel and performing an input process based on the recognized touch.

A display device capable of performing touch recognition (hereinafter, referred to as a "touch display device") includes a plurality of touch electrodes disposed on a display panel (on-cell type) or a plurality of touch electrodes embedded in a display panel (in-cell type), so that the display device can sense a user's touch on the display panel.

For example, in a touch display device, a touch driving circuit applies a touch driving signal to a touch electrode through a touch line and senses a change in capacitance that occurs when the user touches the display panel. In addition, the presence or absence of a touch on the display panel and a touch position can be sensed based on the change in capacitance.

Meanwhile, since such a touch display device provides both a display function and a touch sensing function, electrodes, signal lines, and the like for display driving are disposed on the display panel.

Therefore, capacitance may be formed between the electrodes, the signal lines, and the like for display driving and a touch line to which a touch driving signal is applied. There is a problem in that such capacitance may cause noise on a touch sensing signal.

BRIEF SUMMARY

One aspect of embodiments disclosed herein is to provide a touch display panel and a touch display device, which is capable of sensing a user's touch based on a change in capacitance and of reducing capacitance causing noise on a touch sensing signal, so that touch sensing performance can be enhanced.

In addition, another aspect of embodiments disclosed herein is to provide a touch display panel and a touch display device, in which a structure capable of reducing capacitance causing noise on a touch sensing signal can be easily configured.

Further, an aspect of embodiments disclosed herein is to provide a touch display panel and a touch display device, in which noise of a touch sensing signal can be reduced such that touch sensing can be performed independently of display driving.

In an aspect, embodiments disclosed herein provide a touch display device including: a plurality of touch electrodes embedded in a touch display panel and separated from each other; a touch line overlapping some of the plurality of touch electrodes and connected to one of the overlapped touch electrodes through at least one contact hole; a data line at least partially overlapping the touch line; and a shielding structure disposed between the touch line and the data line and electrically connected to the touch electrode connected to the touch line.

In another aspect, embodiments disclosed herein provide a touch display panel including: a data line; a touch line disposed on the data line and applied with a touch driving signal; a touch electrode connected to the touch line; a shielding structure disposed between the data line and the touch line, the shielding structure being applied with a touch driving signal or a shielding signal corresponding to the touch driving signal; and a touch load reduction layer disposed between the touch line and the shielding structure.

In another aspect, embodiments disclosed herein provide a touch display panel including: a data line; at least one first insulating layer disposed on the data line; a touch electrode disposed on the first insulating layer and partially overlapping the data line; a second insulating layer disposed on the touch electrode; and a touch line disposed on the second insulating layer, and overlapping the data line and the touch electrode.

According to the embodiments of the present disclosure, by arranging a shielding structure in a region where a touch line and a data line overlap each other, it is possible to prevent direct capacitance from being formed between the touch line and the data line.

In addition, by connecting the shielding structure to a touch electrode that forms relatively large capacitance, it is possible to prevent capacitance formed between the shielding structure and the data line from affecting a touch sensing signal transmitted through the touch line.

Accordingly, it is possible to prevent capacitance formed between the data line and the touch line from causing interference that will be seen as noise on a touch sensing signal and thus improve touch sensing performance.

Further, by providing a structure in which the shielding structure is formed on the same layer as the touch electrode or the pixel electrode, it is easy to configure a structure for reducing noise on a touch sensing signal.

Further, by disposing the touch load reduction layer between the shielding structure and the touch line, it is possible to reduce noise caused by capacitance between the touch line and the non-overlapped data line.

As described above, by removing the influence of display noise on a touch sensing signal, touch sensing can be performed independently of display driving.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
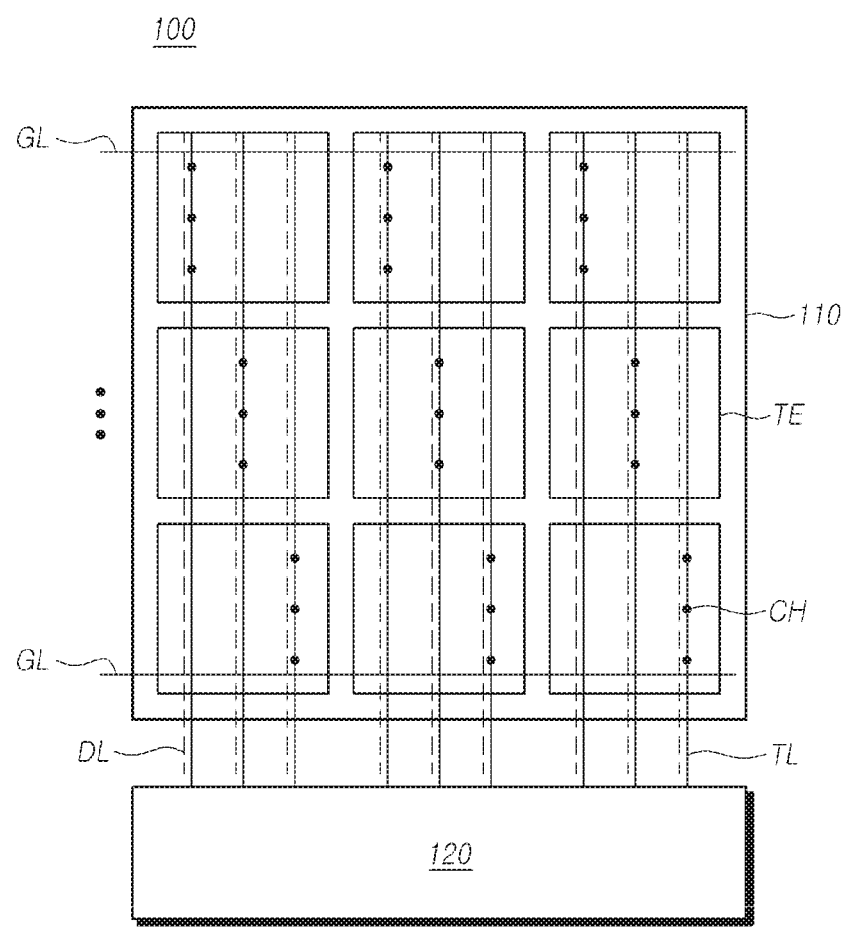
FIG. 1 is a view illustrating a schematic configuration of a touch display device according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to," "is coupled to," or "is in contact with" another structural element, it should be interpreted that the certain structural element "is connected to," "is coupled to," or "is in contact with" directly or indirectly the another structural element.

FIG. 1 is a view illustrating a schematic configuration of a touch display device 100 according to embodiments of the present disclosure.

Referring to FIG. 1, the touch display device 100 according to the embodiments of the present disclosure may include a touch display panel 110 provided with a plurality of touch electrodes TE and a plurality of touch lines TL, and a touch driving circuit 120 configured to drive the touch electrodes TE and the touch lines TL.

The plurality of touch electrodes TE may be disposed on the touch display panel 110 or may be disposed by being embedded in the touch display panel 110.

The plurality of touch electrodes TE may be disposed separately from each other and may be connected to the plurality of touch lines TL, respectively. In this case, the touch electrodes TE are able to receive a touch driving signal output from the touch driving circuit 120 through the touch lines TL and to transmit a touch sensing signal through the touch lines TL.

Alternatively, the plurality of touch electrodes TE may be classified into TX electrodes to which the touch driving signal is applied and RX electrodes configured to transmit the touch sensing signal.

In addition, when the touch display device 100 is a liquid crystal display device, the plurality of touch electrodes TE may be common electrodes TE(COM) to which a common voltage for display driving is applied at the time of display driving.

That is, the plurality of touch electrodes TE may receive a common voltage applied at the time of display driving and may receive a touch driving signal at the time of touch driving.

The plurality of touch lines TL may be arranged to overlap the touch electrodes TE, and each touch line TL may be connected to certain one of the touch electrodes TE through a contact hole CH.

Alternatively, the plurality of touch lines TL may be disposed along the outer peripheral region of the touch display panel 110 and may be connected to the plurality of touch electrodes TE, respectively.

In addition, when the plurality of touch electrodes TE are composed of TX electrodes and RX electrodes, the touch lines may be classified into touch lines TL, which are connected to the TX electrodes, respectively, and touch lines TL, which are connected to the RX electrodes, respectively.

The touch driving circuit 120 outputs a touch driving signal to the touch electrodes TE through the touch lines TL at the time of touch driving and receives a touch sensing signal so as to sense presence and absence of a user's touch and a touch position with respect to the touch display panel 110.

The touch driving circuit 120 may sense a touch based on a change in capacitance generated when a user touches the touch display panel 110. For example, the touch can be sensed through a self-capacitance sensing method or a mutual capacitance sensing method.

In the case of the self-capacitance sensing method, the touch driving circuit 120 outputs a touch driving signal to each touch electrode TE through the touch lines TL during a touch driving period, and receives a touch sensing signal, thereby sensing a user's touch.

In the case of the mutual capacitance sensing method, the touch driving circuit 120 outputs a touch driving signal through the touch lines TL connected to the TX electrodes during a touch driving period and receives a touch sensing signal through the touch lines TL connected to the RX electrodes, thereby sensing a user's touch.

Further, when the self-capacitance sensing method and the mutual capacitance sensing method are used in a time-division manner, it is possible to sense a user's touch using both sensing methods.

In the touch display panel 110 of the touch display device 100, not only a configuration for touch sensing but also a configuration for display driving may be disposed.

For example, a plurality of gate lines GL may be disposed to which a scan signal for controlling the timing of each sub-pixel disposed in the touch display panel 110 during display driving is applied. In addition, a plurality of data lines DL may be disposed to supply data voltage to respective sub-pixels.

In addition, in the case in which the touch display device 100 is a liquid crystal display device, a pixel electrode PXL may be disposed so as to form an electric field with a common electrode COM at the time of display driving.

Therefore, at the time of touch driving, capacitance may be formed between a touch line TL to which a touch driving signal is applied and the electrodes and the signal lines disposed for display driving. Such capacitance may cause interference that will be seen as noise on a touch sensing signal.

In particular, capacitance causing noise may be formed by a signal line disposed to overlap a touch line TL and the touch line TL.

Embodiments of the present disclosure provide a touch display panel 110 and a touch display device 100, in which direct capacitance is prevented from being formed between signal lines overlapping a touch line TL and the touch line TL in the touch display panel 110, whereby such capacitance is prevented from causing noise on a touch sensing signal.

Figure 2:
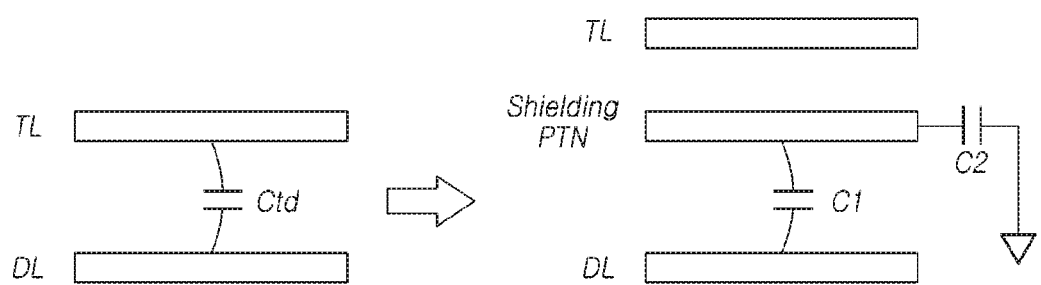
FIG. 2 is a view illustrating a concept of a shielding structure included in the touch display device according to the embodiments of the present disclosure.

FIG. 2 illustrates a concept of a structure that prevents direct capacitance from being formed between signal lines overlapping a touch line TL and the touch line TL in the touch display panel 110 and prevents capacitance formed by the signal lines such as a data line DL from affecting a touch sensing signal.

Referring to FIG. 2, a touch display device 100 according to embodiments of the present disclosure may include a display panel 110 on which a plurality of touch lines TL and a data line DL overlapping a touch line TL may be disposed.

Capacitance Ctd directly formed between the touch line TL and the data line DL may cause interference that will be seen as noise on a touch sensing signal.

The touch display device 100 according to the embodiments of the present disclosure may include a shielding structure (PTN) between the touch line TL and the data line DL such that no direct capacitance is formed between the touch line TL and the data line DL.

Such a shielding structure PTN is arranged so as to overlap the region where the touch line TL and the data line DL overlap each other.

In addition, such a shielding structure PTN may be disposed to overlap the entire data line DL or to overlap a part of the data line DL.

That is, the shielding structure PTN may be formed to completely overlap the data lines DL, but may be formed by appropriately changing the area of the overlapped region as needed.

Therefore, the shielding structure PTN is able to prevent direct capacitance from being formed between the touch line TL and the data line DL.

In addition, the shielding structure PTN is disposed between the touch line TL and the data line DL and may be electrically connected to a touch electrode TE.

Here, although capacitance C1 may be formed between the shielding structure PTN and the data line DL, the shielding structure PTN is in the state of being electrically connected to the touch electrode TE and the touch electrode TE forms relatively large capacitance C2.

Therefore, in order for the capacitance C1 formed by the data line DL and the shielding structure PTN not to affect a touch sensing signal, it is necessary for the capacitance C1 not to affect the capacitance C2 formed on the touch electrode TE connected to the shielding structure PTN.

However, since the capacitance C2 formed on the touch electrode TE is relatively very large compared with the capacitance C1 formed by the data line DL and the shielding structure PTN, the capacitance C1 formed by the data line DL and the shielding structure PTN has almost no effect on the capacitance C2 formed on the touch electrode TE.

Accordingly, the capacitance C1 formed by the data line DL and the shielding structure PTN cannot directly affect the touch line TL and cannot indirectly affect the touch line TL via the touch electrode TE, so that it is possible to prevent the capacitance generated by the data line DL from causing noise on a touch sensing signal.

Figure 3:
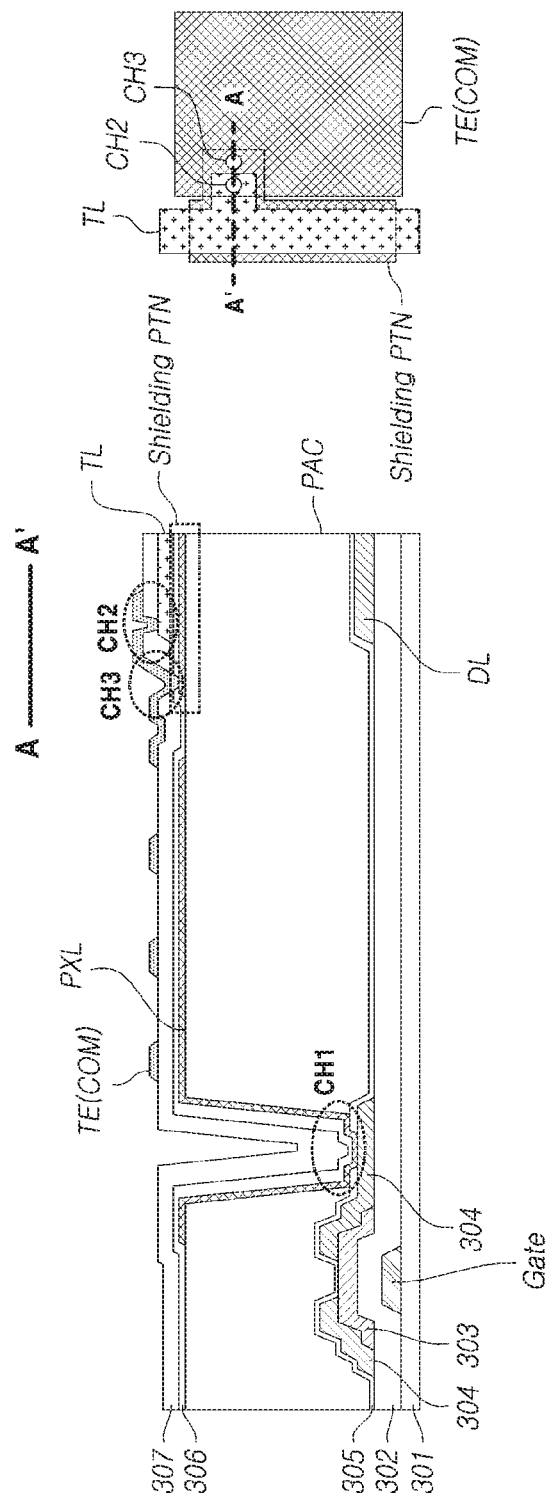
FIGS. 3 and 4 are views each illustrating a first embodiment of a structure in which a shielding structure is disposed in the touch display device according to the embodiments of the present disclosure.
Figure 4:
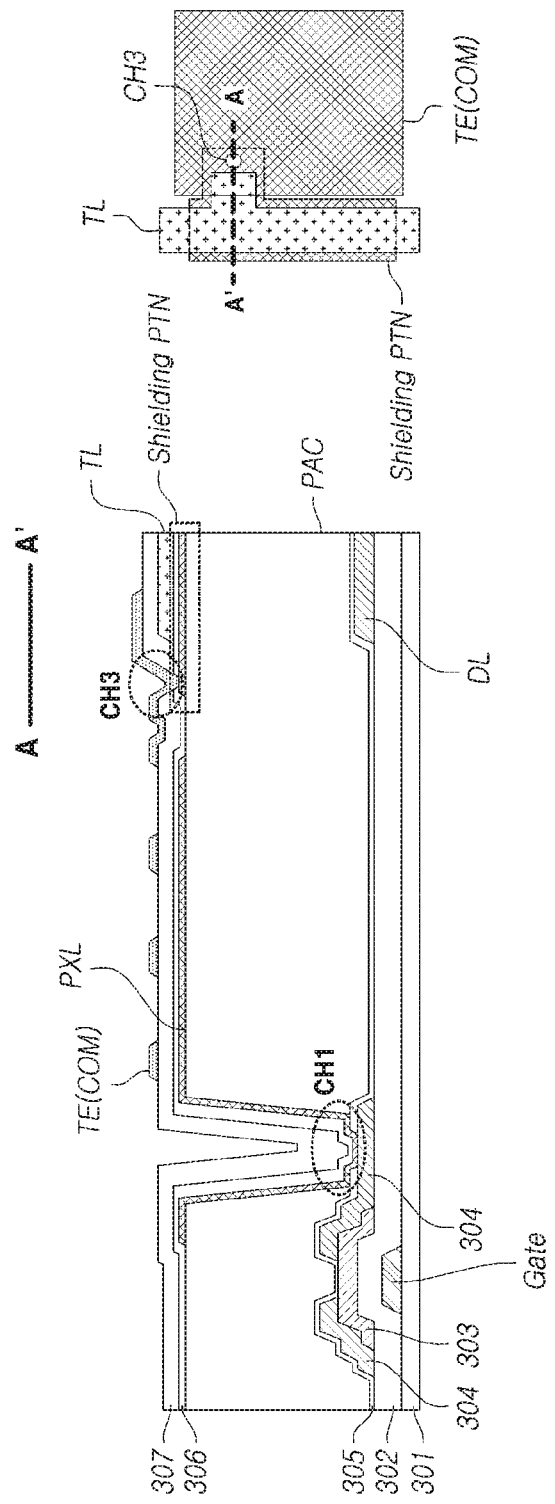

FIGS. 3 and 4 illustrate a first embodiment of a structure in which the shielding structure PTN disclosed above is disposed in the touch display device 100 according to the embodiments of the present disclosure, in which FIG. 3 illustrates a portion where a touch line TL and a touch electrode TE are connected to each other and FIG. 4 illustrates a portion where a touch line TL and a touch electrode TE are not connected to each other. The right figures in FIGS. 3 and 4 are planar views of the first embodiment of the structure in which the shielding structure PTN is disposed, and the left figures in FIGS. 3 and 4 are cross-section views along the lines A'A in the right figures.

Referring to FIG. 3, in the touch display device 100 according to the first embodiment, a gate electrode Gate is disposed on a substrate 301, and a gate insulating layer 302 is disposed on the gate electrode Gate.

An active layer 303, a source/drain electrode 304, and a data line DL are disposed on the gate insulating layer 302.

A first protective layer 305 is disposed on the source/drain electrode 304 and the data line DL, and a planarization layer PAC is disposed on the first protective layer 305. The first protective layer 305 and the planarization layer PAC may be formed of an insulating material.

A pixel electrode PXL may be disposed on the planarization layer PAC, and the pixel electrode PXL may be connected to the source/drain electrode 304 via a first contact hole CH1.

In addition, a second protective layer 306, a touch line TL, a third protective layer 307, and a touch electrode TE may be sequentially disposed on the pixel electrode PXL. Here, the touch electrode TE may be a common electrode COM, to which a common voltage is applied at the time of display driving. The second protective layer 306 and the third protective layer 307 may be formed of an insulating material.

On the layer where the pixel electrode PXL is disposed, the shielding structure PTN may be disposed in a structure insulated from the pixel electrode PXL in a region where the touch line TL and the data line DL overlap each other.

That is, the shielding structure PTN according to the first embodiment of the present disclosure may be disposed on the same layer as the pixel electrode PXL and may be formed of the same material as the pixel electrode PXL. At this time, the shielding structure PTN may be disposed in a structure electrically insulated from the pixel electrode PXL.

Such a shielding structure PTN may be disposed so as to completely cover a region where the touch line TL and the data line DL overlap each other.

Alternatively, the shielding structure PTN according to the first embodiment of the present disclosure may be disposed to include at least a portion of the region where the touch line TL and the data line DL overlap each other.

Therefore, the shielding structure PTN may be disposed between the touch line TL and the data line DL so as to prevent direct capacitance from being formed between the touch line TL and the data line DL.

In addition, the shielding structure PTN may have a structure that is electrically connected to the touch electrode TE.

At this time, while the shielding structure PTN is electrically connected to the touch line TL through the touch electrode TE, the shielding structure PTN is not directly connected to the touch line TL.

This is because, when the shielding structure PTN is directly connected to the touch line TL, parasitic capacitance formed between the data line DL and the shielding structure PTN may also affect the touch line TL.

That is, as illustrated in FIG. 3, the touch electrode TE may be connected to the touch line TL via a second contact hole CH2 and may be connected to the shielding structure via a third contact hole CH3. In addition, although the shielding structure PTN is connected to the touch electrode TE connected to the touch line TL but is not directly connected to the touch line TL.

Since the shielding structure PTN is electrically connected to the touch electrode TE to which a touch driving signal is applied at the time of touch driving, the shielding structure PTN forms relatively large capacitance with the touch electrode TE.

Therefore, even if capacitance is formed between the shielding structure PTN and the data line DL, such capacitance cannot affect relatively large capacitance formed by the shielding structure PTN and the touch electrode TE.

Therefore, by preventing the capacitance formed between the shielding structure PTN and the data line DL from indirectly affecting the touch line TL, it is possible to prevent noise generated due to capacitance generated by the data line DL from causing a touch sensing signal transmitted through the touch line TL.

That is, the shielding structure PTN may also prevent capacitance, which is generated by the data line DL, through a structure connected to the touch electrode TE, from indirectly affecting a touch sensing signal while preventing direct capacitance from being formed between the data line DL and the touch line TL.

Thereby, in a structure where the touch line TL and the data line DL overlap each other, it is possible to reduce noise of a touch sensing signal and to improve touch sensing performance.

Referring to FIG. 4, a shielding structure PTN is disposed between a touch line TL and a data line DL in a portion where the touch line TL is not connected to a touch electrode TE.

Here, the shielding structure PTN is electrically connected to the touch electrode TE via a third contact hole CH3.

That is, the touch line TL is connected to a portion of some of the plurality of overlapped touch electrodes TE, but each shielding structure (Shielding PTN) may be electrically connected to the overlapped touch electrodes TE through at least one contact hole.

In addition, by disposing such a shielding structure PTN on the same layer as the pixel electrode PXL, a structure for preventing the formation of direct capacitance between the touch line TL and the data line DL may be easily formed.

Figure 5:
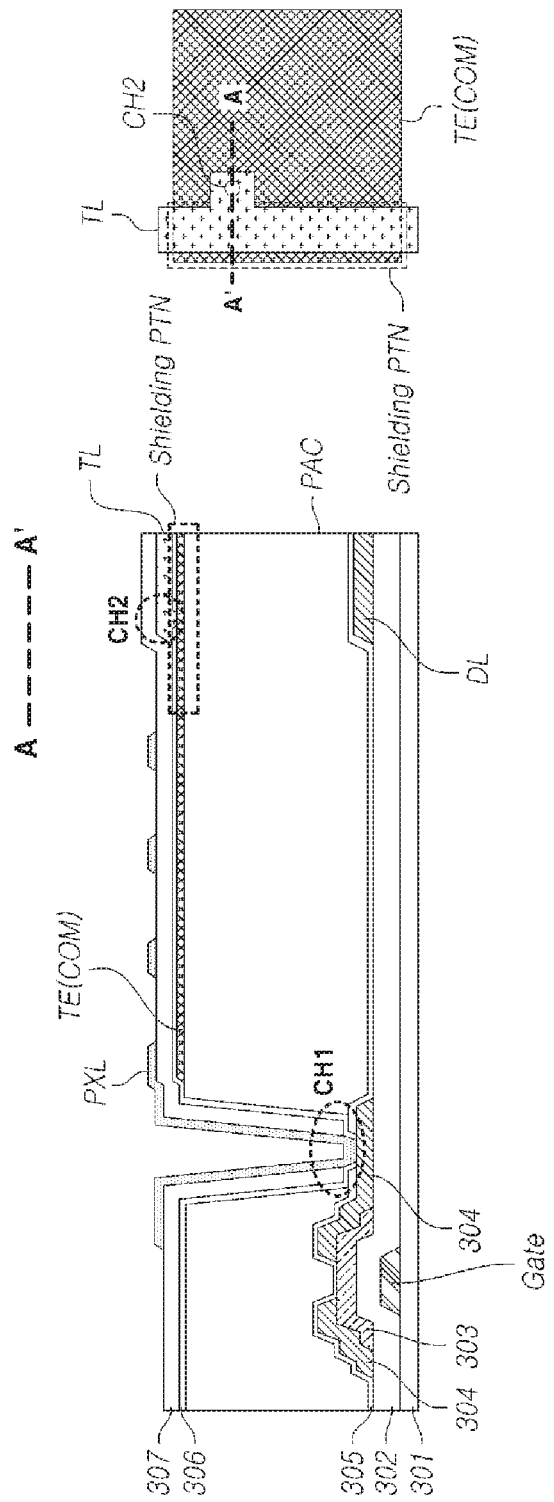
FIGS. 5 and 6 are views each illustrating a second embodiment of a structure in which a shielding structure is disposed in the touch display device according to the embodiments of the present disclosure.
Figure 6:
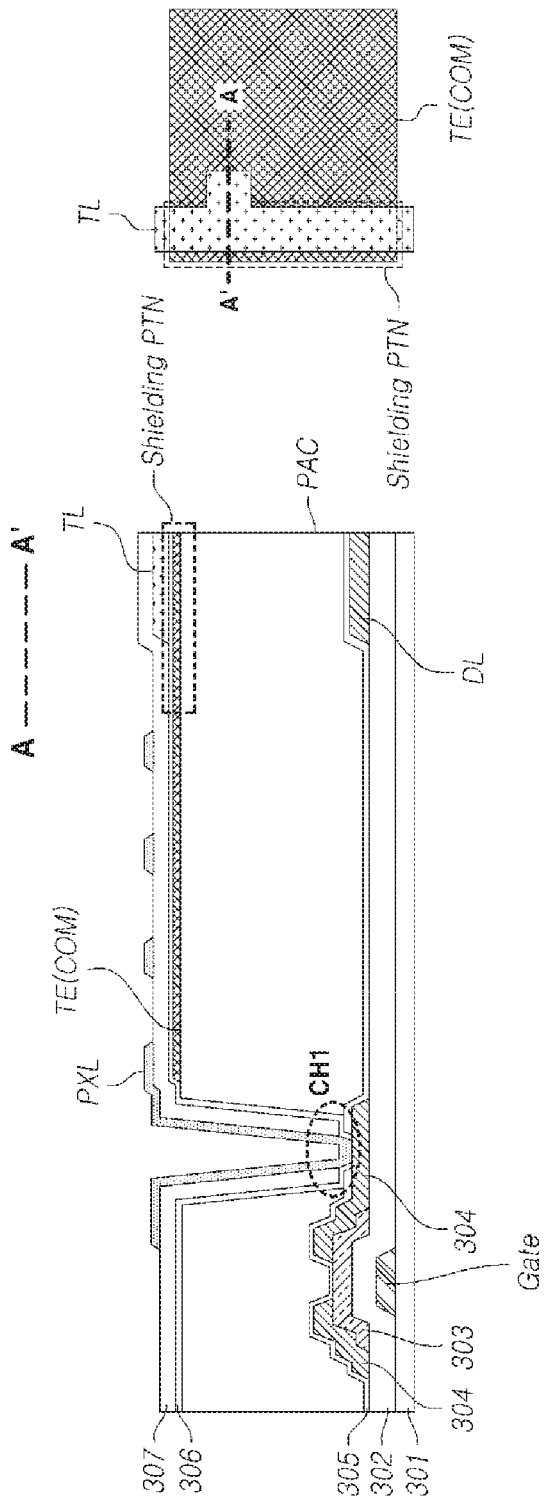

FIGS. 5 and 6 are views each illustrating a second embodiment of a structure in which a shielding structure PTN is disposed in a touch display device 100 according to the embodiments of the present disclosure. The right figures in FIGS. 5 and 6 are planar views of the second embodiment of the structure in which the shielding structure PTN is disposed, and the left figures in FIGS. 5 and 6 are cross-section views along the lines A'A in the right figures.

FIG. 5 illustrates a portion where a touch line TL and a touch electrode TE are connected in the touch display device 100 according to the second embodiment, and FIG. 6 illustrates a portion where a touch line TL and a touch electrode TE are not connected to each other.

Referring to FIG. 5, in the touch display device 100 according to the second embodiment, a gate electrode Gate is disposed on a substrate 301, and a gate insulating layer 302 is disposed on the gate electrode Gate.

An active layer 303, a source/drain electrode 304, a data line DL, and a first protective layer 305 are disposed on the gate insulating layer 302.

A planarization layer PAC is disposed on the first protective layer 305, and a touch electrode TE, i.e., a common electrode TE (COM), is disposed on the planarization layer PAC.

A second protective layer 306, a touch line TL, a third protective layer 307, and a pixel electrode PXL are sequentially disposed on the touch electrode TE, and the pixel electrode PXL is connected to a source/drain electrode 304 via a first contact hole CH1.

Here, the touch line TL is connected to the touch electrode TE via a second contact hole CH2.

Here, a shielding structure PTN is disposed in a region where the touch line TL and the data line DL overlap each other on the layer where the touch electrode TE is disposed. In addition, the shielding structure PTN is connected to the touch electrode TE.

Accordingly, by disposing the shielding structure PTN on the same layer as the touch electrode TE, the shielding structure PTN can be easily formed and can be connected to the touch electrode TE without a separate contact hole.

In addition, the shielding structure PTN according to the second embodiment of the present disclosure may be disposed on the same layer as the touch electrode TE and may be formed of the same material as the touch electrode TE. At this time, at least a partial region of the touch electrode TE may be extended and disposed in the shielding structure PTN.

Referring to FIG. 6, even in the portion where the touch line TL and the touch electrode TE are not connected to each other, the shielding structure PTN is disposed on a layer where the touch electrode TE is disposed between the touch line TL and the data line DL.

Accordingly, the shielding structure PTN is able to prevent direct capacitance from being formed between the touch line TL and the data line DL and to prevent capacitance generated by the data line DL from causing noise on a touch sensing signal.

Meanwhile, the above-described embodiments exemplify a case in which a touch electrode TE is formed below a pixel electrode PXL. However, even if the pixel electrode PXL is formed below the touch electrode TE, a shielding structure PTN connected to the touch electrode TE without a separate contact hole may be disposed.

Figure 7:
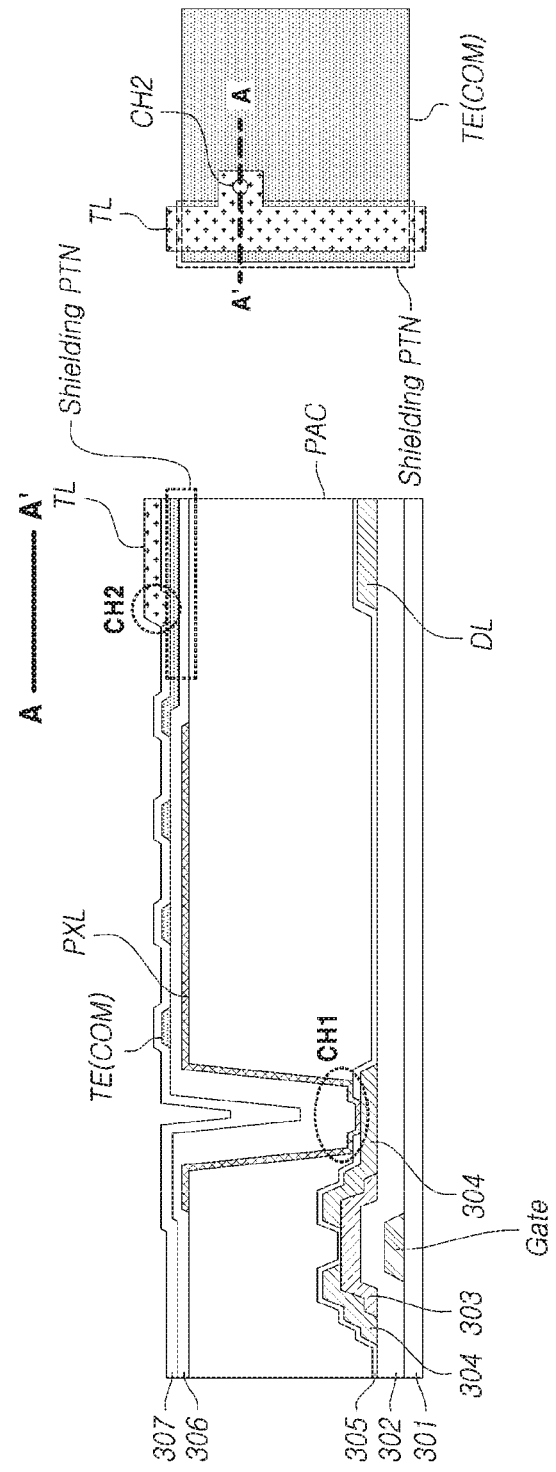
FIGS. 7 and 8 are views each illustrating a third embodiment of a structure in which a shielding structure is disposed in the touch display device according to the embodiments of the present disclosure.
Figure 8:
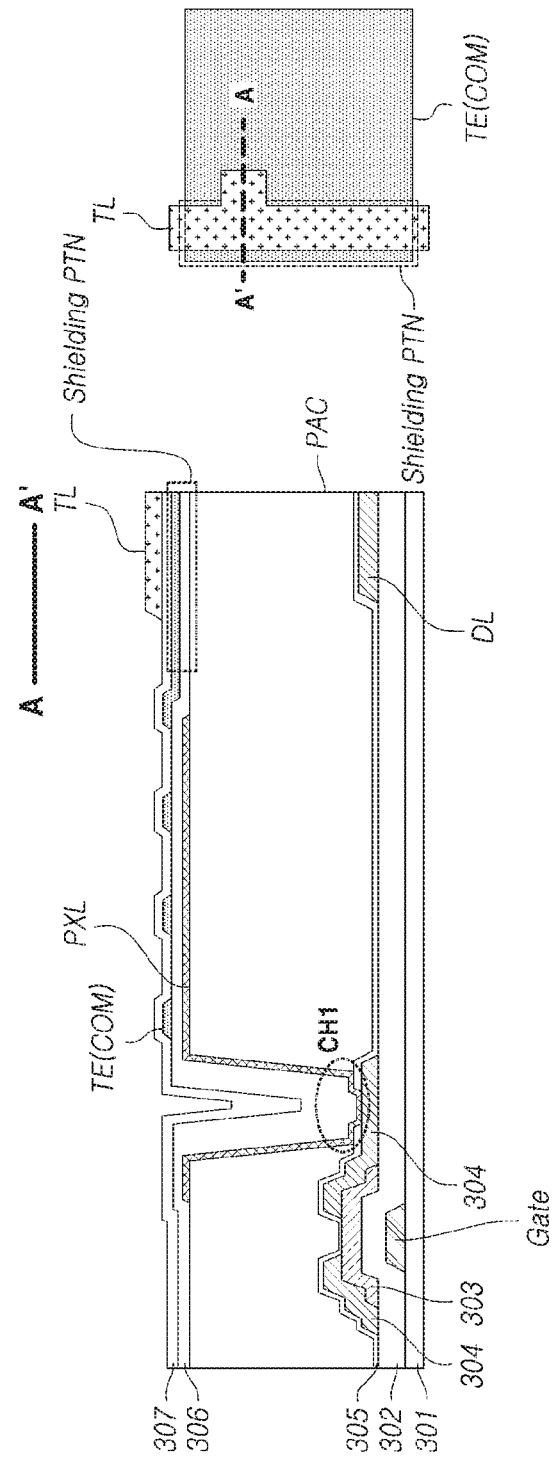

FIGS. 7 and 8 are views each illustrating a third embodiment of a structure in which a shielding structure PTN is disposed in a touch display device 100 according to the embodiments of the present disclosure. The right figures in FIGS. 7 and 8 are planar views of the third embodiment of the structure in which the shielding structure PTN is disposed, and the left figures in FIGS. 7 and 8 are cross-section views along the lines A'A in the right figures.

FIG. 7 illustrates a portion where a touch line TL and a touch electrode TE are connected in the touch display device 100 according to the third embodiment, and FIG. 8 illustrates a portion where a touch line TL and a touch electrode TE are not connected to each other.

Referring to FIG. 7, in the touch display device 100 according to the third embodiment, a gate electrode Gate is disposed on a substrate 301, and a gate insulating layer 302 is disposed on the gate electrode Gate.

An active layer 303, a source/drain electrode 304, a data line DL, and a first protective layer 305 are disposed on the gate insulating layer 302.

A planarization layer PAC is disposed on the first protective layer 305 and a pixel electrode PXL is disposed on the planarization layer PAC.

The pixel electrode PXL may be connected to the source/drain electrode 304 via a first contact hole CH1.

A second protective layer 306 is disposed on the pixel electrode PXL, and a touch electrode TE is disposed on the second protective layer 306.

A third protective layer 307 is disposed on the touch electrode TE, and a touch line TL is disposed on the third protective layer 307.

The touch line TL may be connected to the touch electrode TE via a second contact hole CH2.

Here, a shielding structure PTN is disposed in a region where the touch line TL and the data line DL overlap each other on the layer where the touch electrode TE is disposed, and the shielding structure PTN is connected to the touch electrode TE.

That is, even when the touch electrode TE is disposed on an upper layer relative to the pixel electrode PXL by disposing the touch line TL on the upper layer relative to the touch electrode TE, the shielding structure PTN disposed between the touch line TL and the data line DL and the touch electrode TE can be connected to each other without a separate contact hole.

In addition, the shielding structure PTN according to the third embodiment of the present disclosure may be disposed on the same layer as the touch electrode TE and may be formed of the same material as the touch electrode TE. At this time, at least a partial region of the touch electrode TE may be extended and disposed in the shielding structure PTN.

Referring to FIG. 8, the touch electrode TE is disposed on an upper layer relative to the pixel electrode PXL and the touch line TL is disposed on an upper layer relative to the touch electrode TE.

In addition, a shielding structure PTN is disposed in a region where the touch line TL and the data line DL overlap each other on the layer where the touch electrode TE is disposed, and the shielding structure PTN is connected to the touch electrode TE.

Therefore, the shielding structure PTN for preventing the formation of direct capacitance between the touch line TL and the data line DL can be easily disposed, and the shielding structure PTN can be connected to the touch electrode TE without a separate contact hole.

In addition, by changing the arrangement of the touch electrode TE and the pixel electrode PXL in the above-described structure, the touch line TL and the shielding structure PTN can be formed more simply.

Figure 9:
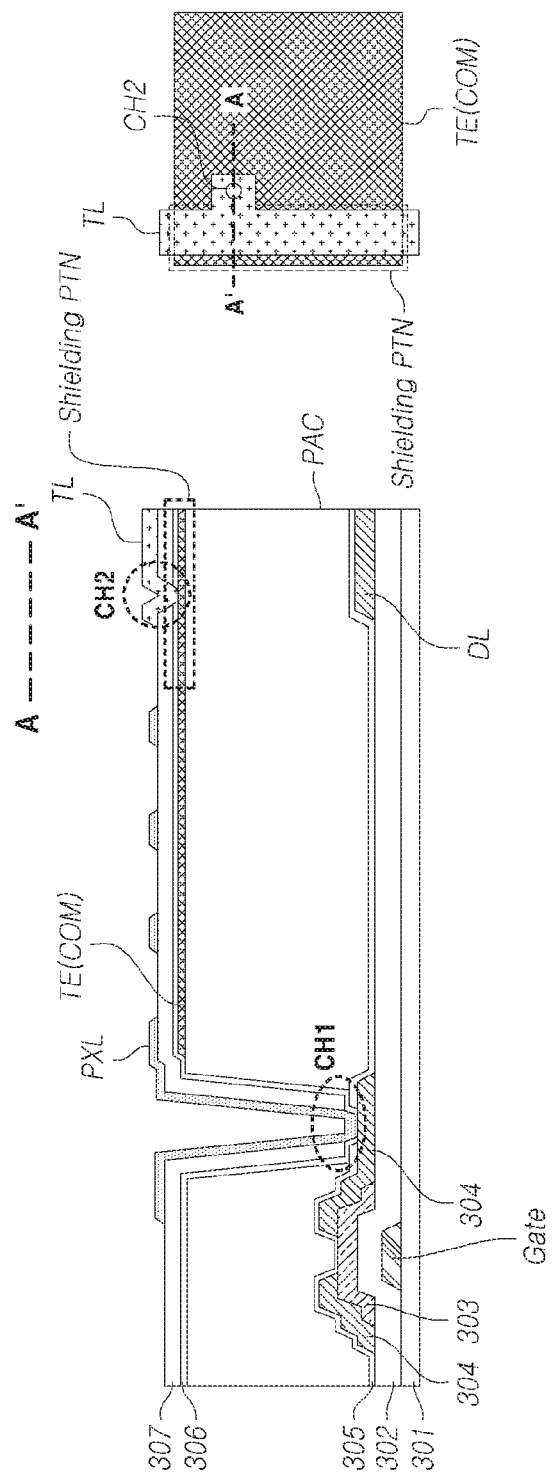
FIGS. 9 and 10 are views each illustrating a fourth embodiment of a structure in which a shielding structure is disposed in the touch display device according to the embodiments of the present disclosure.
Figure 10:
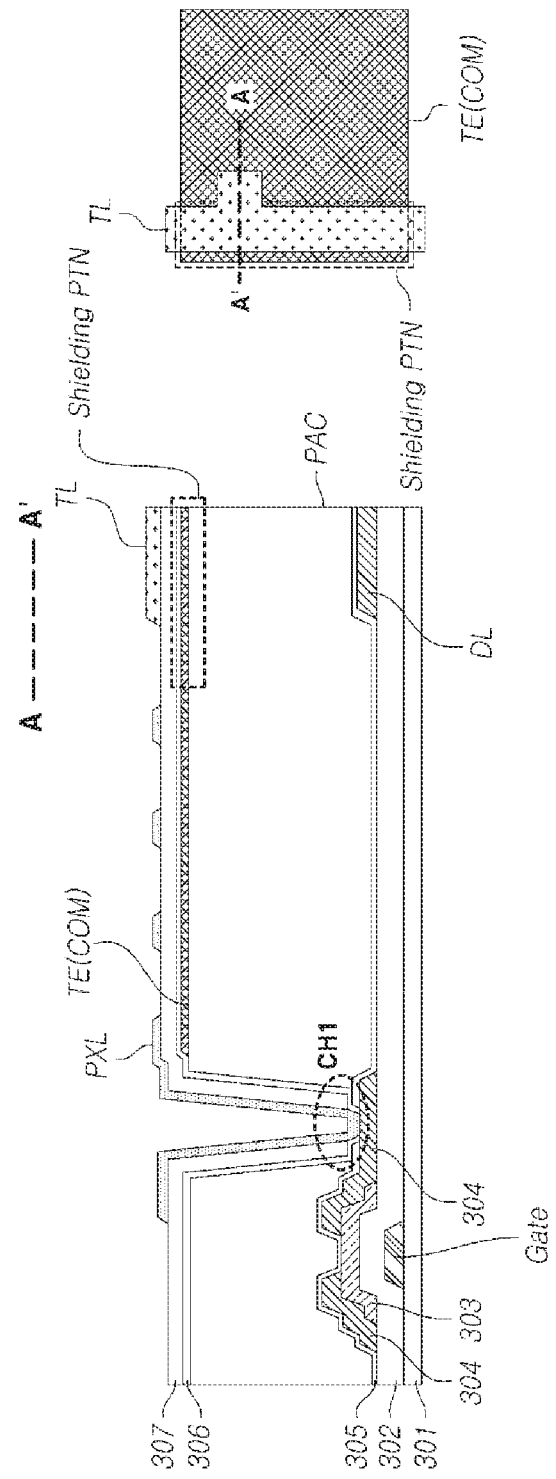

FIGS. 9 and 10 are views each illustrating a fourth embodiment of a structure in which a shielding structure PTN is disposed in a touch display device 100 according to the embodiments of the present disclosure. The right figures in FIGS. 9 and 10 are planar views of the fourth embodiment of the structure in which the shielding structure PTN is disposed, and the left figures in FIGS. 9 and 10 are cross-section views along the lines A'A in the right figures.

FIG. 9 illustrates a portion where a touch line TL and a touch electrode TE are connected in the touch display device 100 according to the fourth embodiment, and FIG. 10 illustrates a portion where a touch line TL and a touch electrode TE are not connected to each other.

Referring to FIG. 9, in the touch display device 100 according to the fourth embodiment, a gate electrode Gate is disposed on a substrate 301, and a gate insulating layer 302 is disposed on the gate electrode Gate.

An active layer 303, a source/drain electrode 304, a data line DL, and a first protective layer 305 are disposed on the gate insulating layer 302.

A planarization layer PAC is disposed on the first protective layer 305 and a touch electrode TE is disposed on the planarization layer PAC.

A second protective layer 306 and a third protective layer 307 are disposed on the touch electrode TE, and a pixel electrode TXL and a touch line TL are disposed on the third protective layer 307.

Here, only one of the second protective layer 306 and the third protective layer 307 may be disposed.

A shielding structure PTN is disposed in a region where the touch line TL and the data line DL overlap each other on the layer where the touch electrode TE is disposed, and the shielding structure PTN is connected to the touch electrode TE.

The pixel electrode PXL disposed on the third protective layer 307 is connected to the source/drain electrode 304 via a first contact hole CH1 and the touch line TL is connected to the touch electrode TE via a second contact hole CH2.

In addition, the shielding structure PTN according to the fourth embodiment of the present disclosure may be disposed on the same layer as the touch electrode TE and may be formed of the same material as the touch electrode TE. At this time, at least a partial region of the touch electrode TE may be extended and disposed in the shielding structure PTN.

Referring to FIG. 10, at least one protective layer is disposed on the touch electrode TE in a portion where the touch line TL and the touch electrode TE are not connected to each other, and the pixel electrode PXL and the touch line TL are disposed on the protective layer.

Even in the portion where the touch line TL and the touch electrode TE are not connected to each other, the shielding structure PTN connected to the touch electrode TE is disposed between the touch line TL and the data line DL.

Accordingly, by forming the shielding structure PTN on the same layer as the touch electrode TE, the shielding structure PTN can be easily disposed and can be connected to the touch electrode TE without a separate contact hole.

In addition, by forming the touch line TL on the same layer as the pixel electrode PXL, the touch line TL can be easily formed.

In addition, by disposing the shielding structure PTN connected to the touch electrode TE in a region where the touch line TL and the data line DL overlap each other, direct capacitance is not formed between the touch line TL and the data line DL and capacitance generated by the data line DL does not affect a touch sensing signal.

According to the embodiments of the present disclosure described above, by disposing a shielding structure PTN in a region where a touch line TL and a data line DL overlap each other, direct capacitance is prevented from being formed between the touch line TL and the data line DL.

In addition, by electrically connecting the shielding structure PTN to the touch electrode TE, capacitance formed between the shielding structure PTN and the data line DL does not affect a touch sensing signal transmitted through the touch line TL.

Accordingly, in a structure in which the touch line TL and the data line DL overlap each other, capacitance generated by the data line DL can be prevented from causing interference that will be seen as noise on a touch sensing signal, and touch sensing performance can be improved.

Meanwhile, by the shielding PTN, it is possible to reduce noise caused due to direct capacitance between the touch line TL and the overlapped data line DL. However, noise may be present due to capacitance between the touch line TL and the data line DL adjacent thereto in the horizontal direction.

That is, noise due to capacitance formed between the touch line TL and the data line DL, which does not overlap the touch line TL may affect a touch sensing signal.

The touch display device 100 according to the embodiments of the present disclosure provides a method which is capable of preventing occurrence of noise due to capacitance (vertical direction) between the touch line TL and the overlapped data line DL through the shielding structure (shielding PTN) and capable of reducing noise due to capacitance (in a horizontal direction or diagonal direction) between the touch line TL and the data line DL which does not overlap the touch line.

Figure 11:
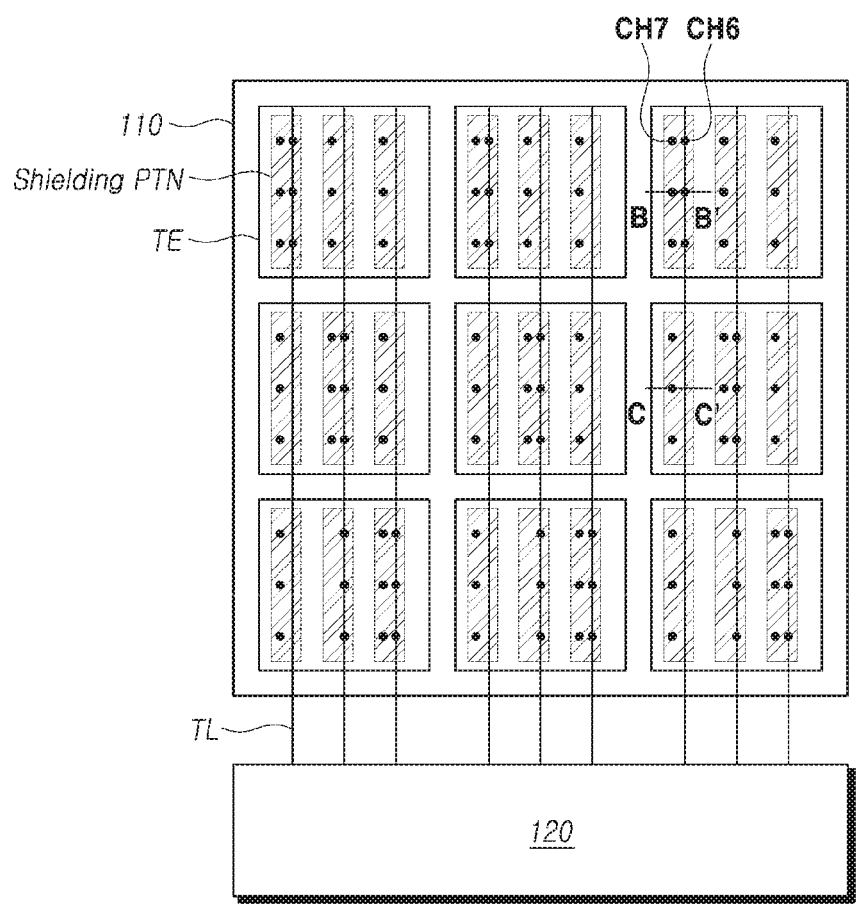
FIG. 11 is a view illustrating an example of a planar structure in which touch lines and shielding structures are arranged in a touch display device according to embodiments of the present disclosure.

FIG. 11 illustrates an example of a planar structure in which touch lines TL and shielding structures (Shielding PTN) are arranged in a touch display device 100 according to embodiments of the present disclosure.

Referring to FIG. 11, the touch display device 100 according to embodiments of the present disclosure may include a touch display panel 110 having a plurality of touch electrodes TE disposed thereon, and a touch driving circuit 120 configured to detect a touch on the touch display panel 110 by driving the touch electrodes TE. In addition, a plurality of touch lines TL may be arranged to connect the plurality of touch electrodes TE and the touch driving circuit 120 with each other. The touch lines TL may be connected to the touch electrodes TE through one or more sixth contact holes CH6.

Since the touch electrodes TE may be common electrodes COM to which a common voltage for display driving is applied, the touch electrodes TE may be arranged to overlap a plurality of sub-pixels SP. Accordingly, the data lines DL configured to supply the data voltage to sub-pixels SP may be arranged in the same direction as the touch lines TL connected to the touch electrodes TE. Further, at least some of the data lines DL and the touch lines TL may be arranged to overlap each other in order to increase an opening ratio.

As described above, capacitance may be formed between the touch lines TL and the data line DLs by the structure in which the touch lines TL and the data lines DL are arranged, and noise may be generated in a touch sensing signal detected through the touch lines TL.

Accordingly, the touch display device 100 according to the embodiments of the present disclosure may be configured such that shielding structures (shielding PTN) are disposed between the touch lines TL and the data lines DL as illustrated in FIG. 11, so that direct capacitance can be prevented from being formed between the touch lines TL and the data lines DL. Therefore, it is possible to reduce the noise of a touch sensing signal, which is caused due to the capacitance formed between the touch lines TL and the data lines DL.

In addition, the shielding structures (Shielding PTN) may be connected to the touch electrodes TE through one or more seventh contact holes CH7. Therefore, touch driving signals applied to the touch electrodes TE may be applied to the shielding structures (shielding PTN). Therefore, it is possible to prevent noise from being generated in the touch sensing signals detected through the touch lines TL due to the capacitance between the data lines DL and the shielding structures PTN.

Further, by preventing the capacitance generated due to the data line DL and the shielding structures PTN from causing noise to the touch sensing signal detected through the touch lines TL, touch sensing can be performed independently of display driving.

That is, the touch sensing may be performed in a period temporally separated from the display driving, or may be performed simultaneously with the display driving. In this case, when the display driving and the touch sensing are simultaneously performed, a data voltage modulated based on the touch driving signal may be applied to the data line DLs. The data voltage may be modulated by ground voltage modulation, gamma voltage modulation, or the like.

By arranging the shielding structures (Shielding PTN) to which the touch driving signal is applied between the touch lines TL and the data lines DL as described above, the noise of the touch sensing signal can be reduced and the display driving and the touch sensing can be performed simultaneously.

The touch display device 100 according to the embodiments of the present disclosure may include an insulating layer disposed between the touch lines TL and the shielding structures PTN and having a predetermined height in order to reduce noise generated due to capacitance formed between the touch line TL and the data line DL disposed in the horizontal direction. This insulating layer is located overlying the data line DL.

That is, by arranging the insulating film having a predetermined height between the touch lines TL and the shielding structures (Shielding PTN), it is possible to reduce the capacitance between the touch lines TL and the data lines DL disposed in the horizontal direction, and thus to improve touch sensing performance.

Figure 12:
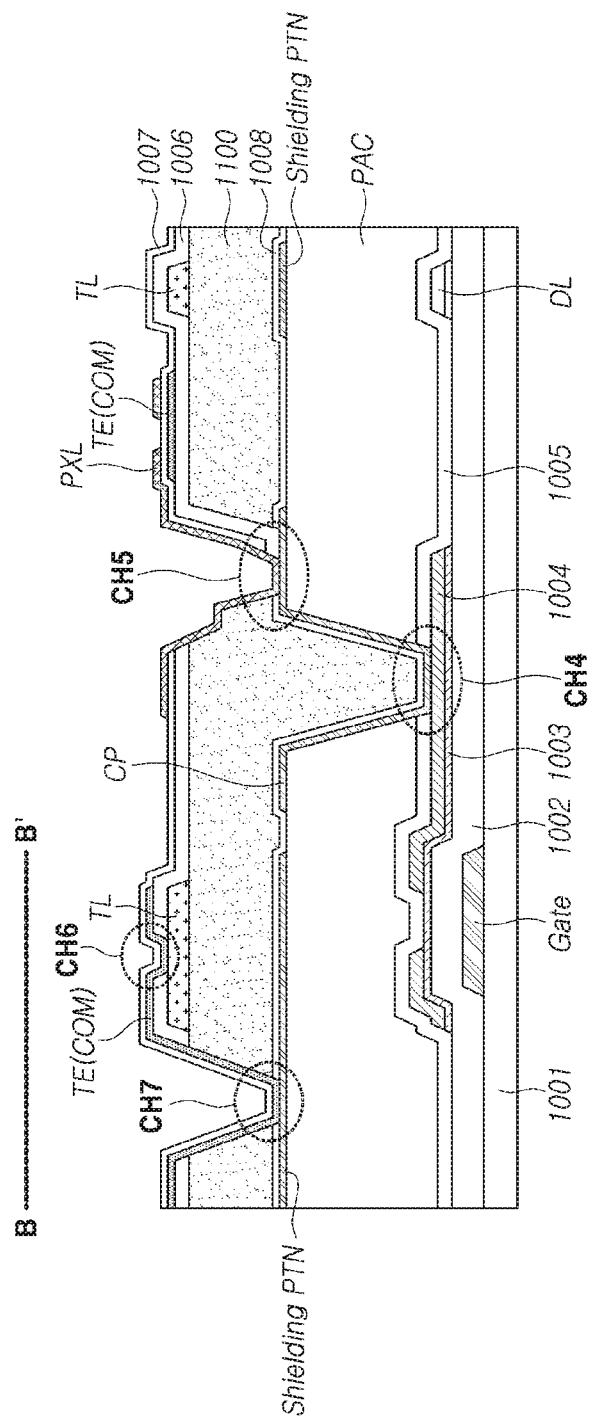
FIGS. 12 and 13 are views illustrating examples of cross-sectional structures of a portion B-B' and a portion C-C' in the touch display device illustrated in FIG. 11.
Figure 13:
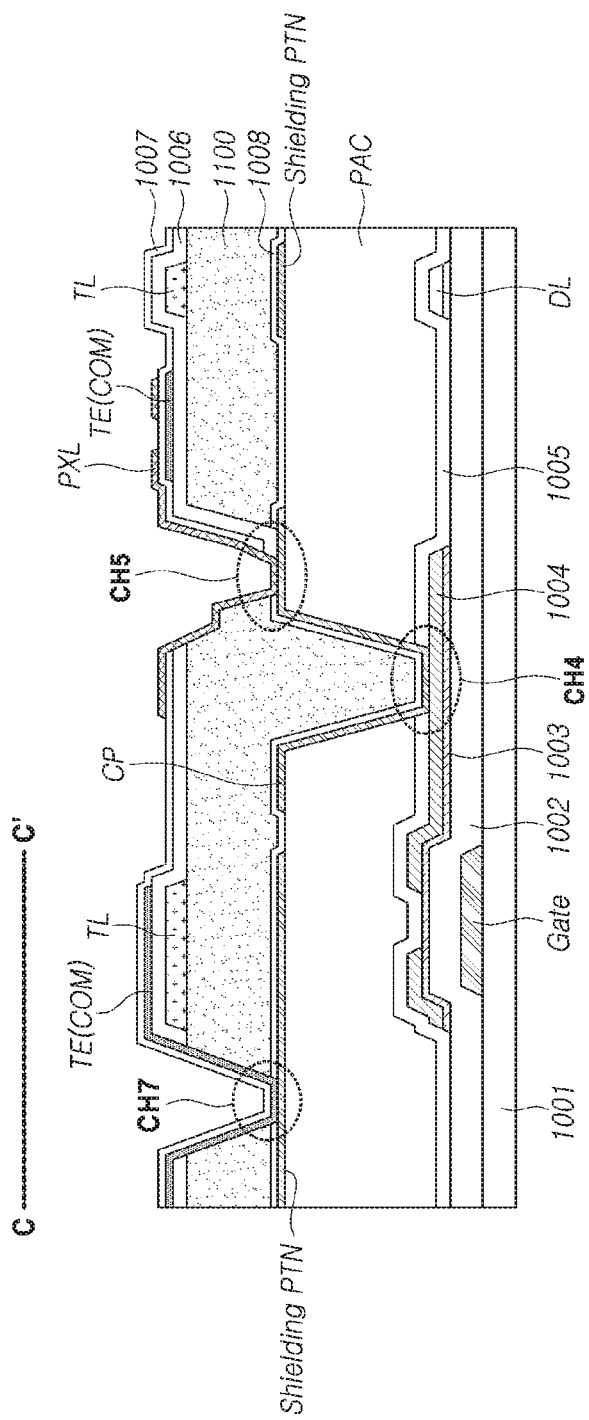

FIGS. 12 and 13 illustrate examples of cross-sectional structures of the touch display device 100 illustrated in FIG. 11, in which FIG. 12 illustrates an example of a cross-sectional structure of a portion B-B' in FIG. 11 and FIG. 13 illustrates an example of a cross-sectional structure of a portion C-C' in FIG. 11.

Referring to FIGS. 12 and 13, a gate electrode (Gate) is disposed on a substrate 1001, and a gate insulating layer 1002 is disposed on the gate electrode (Gate). In addition, an active layer 1003, a source/drain electrode 1004, and a data line DL are disposed on the gate insulating layer 1002.

A first protective layer 1005 is disposed on the source/drain electrode 1004 and the data line DL, and a planarization layer PAC is disposed on the first protective layer 1005. The first protective layer 1005 and the planarization layer PAC may be formed of an insulating material.

A shielding structure (Shielding PTN) may be disposed on the planarization layer PAC and a touch load reduction layer 1100 having a predetermined height may be disposed on the shielding structure (Shielding PTN).

In addition, touch lines TL may be disposed on the touch load reduction layer 1100.

A second protective layer 1006 is disposed on a touch line TL and a touch electrode TE are disposed on the second protective layer 1006. A third protective layer 1007 may be disposed on the touch electrode TE and a pixel electrode PXL may be disposed on the third protective layer 1007.

Here, the second protective layer 1006 insulates the touch line TL from the touch electrode TE, and the third protective layer 1007 insulates the touch electrode TE and the pixel electrode PXL from each other.

A fourth protective layer 1008 may be further disposed between the shielding structure (Shielding PTN) and the touch load reduction layer 1100.

The touch line TL may be connected to the touch electrode TE through a sixth contact hole CH6 formed in the second protective layer 1006 as illustrated in FIG. 12. In a portion where the touch line TL is not connected to the touch electrode TE, a structure as illustrated in FIG. 13 may be provided.

The touch electrode TE is connected to a shielding structure (Shielding PTN) located under the touch load reduction layer 1100 through a seventh contact hole CH7 formed in the touch load reduction layer 1100. Accordingly, a touch driving signal can be applied to the shielding structure (shielding PTN).

By disposing the shielding PTN and the touch load reduction layer 1100 in this manner, it is possible to prevent noise due to the data line DL at the time of touch sensing and to reduce the parasitic capacitance that may be generated between the data line DL and the touch line TL.

Accordingly, it is possible to minimize the parasitic capacitance between the touch line TL and the data line DL, and it is possible to reduce the noise of the touch sensing signal due to the parasitic capacitance, thereby improving the touch sensing performance.

Meanwhile, since the touch load reduction layer 1100 is disposed on the shielding structure (Shielding PTN), the pixel electrode PXL may be connected to the source/drain electrode 1004 through a connection structure CP disposed between the planarization layer PAC and the touch load reduction layer 1100.

That is, the connection structure CP insulated from the shielding structure (Shielding PTN) may be disposed on the planarization layer PAC. The connection structure CP may be made of the same material as the shielding structure (Shielding PTN).

In addition, the connection structure CP may be connected to the source/drain electrode 1004 through the fourth contact hole CH4 formed in the planarization layer PAC. The pixel electrode PXL located on the touch load reduction layer 1100 may be connected to the connection structure CP through the fifth contact hole CH5 disposed in the touch load reduction layer 1100.

Accordingly, by arranging the connection structure CP in the process of disposing the shielding structure (Shielding PTN), a connection structure between the pixel electrode PXL and the source/drain electrode 1004 can be easily implemented in the structure including the touch load reduction layer 1100.

In one embodiment, the planarization layer PAC is thicker than the touch load reduction layer 1100, and thus has a greater height than the touch load reduction layer 1100. Examples of this are illustrated in FIGS. 12, 13, 14, 15 and 16. The planarization layer PAC is an insulting layer that provides a planar upper surface over the various transistor structures on the substrate 1001 and therefor is sufficiently thick to fill any lower regions while having a top surface that extends in a planar fashion over both tall and short structural elements below it.

While FIGS. 12 and 13 illustrate a structure in which the pixel electrode PXL is located above the touch electrode TE, which is a common electrode COM, as an example, the touch electrode TE may be disposed above the pixel electrode PXL in some embodiments.

That is, in the structure in which the stacking order of the data line DL, the shielding structure (Shielding PTN), the touch load reduction layer 1100, and the touch line TL is maintained as shown in FIG. 13, the positions and relative stacking order of other components, such as the pixel electrode PXL and touch electrode TE may vary according to design and the convenience of process.

As described above, it is possible to improve touch sensing performance by disposing a shielding PTN between a data line DL and a touch line TL.

A touch driving signal may be applied to a shielding structure (Shielding PTN) through a connection structure between the shielding structure (Shieling PTN) and a touch electrode TE. The shielding structure can be driven by an integrated circuit that is outside of the display panel. That is a signal can be provided from a separate circuit that is not within the touch driving circuit 120, and is under control of a central processor or from another outside source. It can also be driven by a different circuit that is within the touch driving circuit 120 but that is not the touch driving signal. This signal can correspond to the touch driving signal or be separate signal that is just supplied to the shielding structure, depending on the embodiment.

Figure 14:
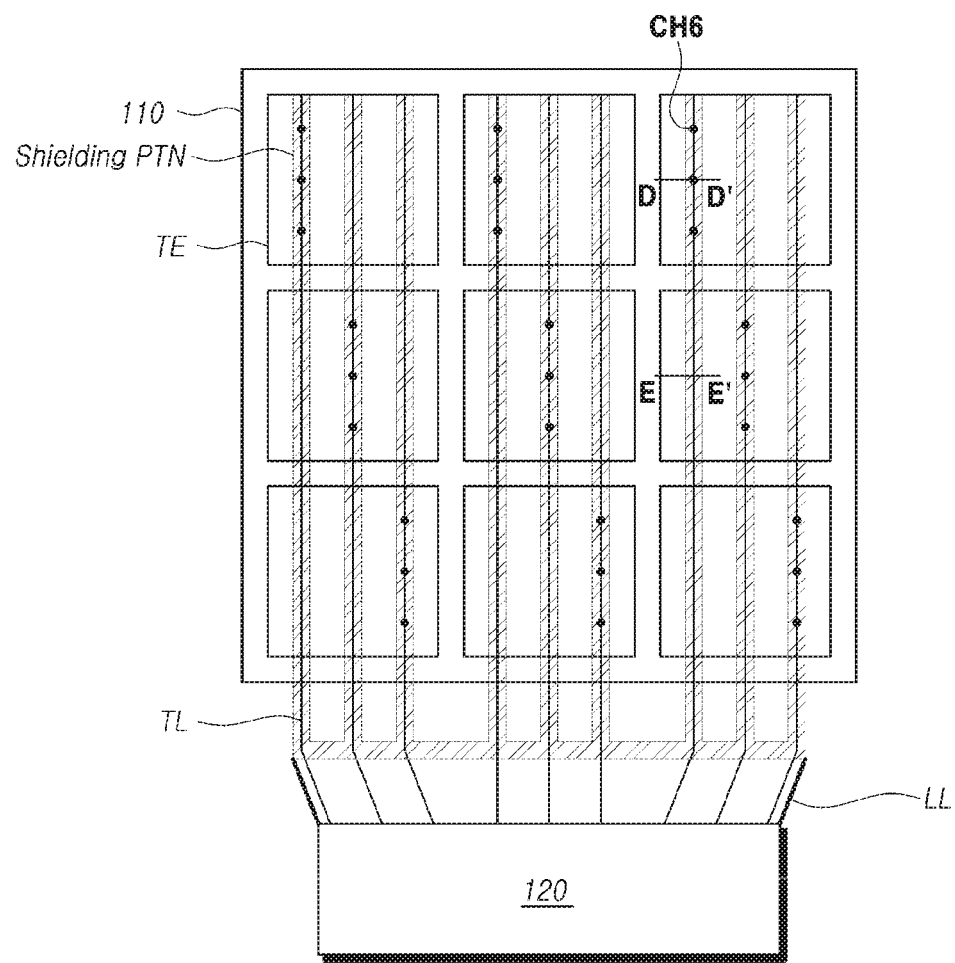
FIG. 14 is a view illustrating another example of a planar structure in which touch lines and shielding structures are disposed in a touch display device according to embodiments of the present disclosure.

FIG. 14 illustrates another example of a planar structure in which touch lines TL and shielding structures (Shielding PTN) are arranged in a touch display device 100 according to embodiments of the present disclosure, as an example.

Referring to FIG. 14, a touch display device 100 according to embodiments of the present disclosure may include a plurality of touch electrodes TE, and a plurality of touch lines TL, which are respectively connected to the plurality of touch electrodes TE through at least one sixth contact hole CH6. In addition, the touch display device may include shielding structures (Shielding PTN) disposed between the touch lines TL and the data lines DL.

The shielding structures (Shielding PTN) are not directly connected to the touch electrodes TE, and may be applied with a shielding signal corresponding to a touch driving signal from an outside source, as previously stated.

Here, the shielding signal may be a signal having the same frequency and phase as the frequency and phase of the touch driving signal. Further, the shielding signal may be a signal having the same amplitude as the amplitude of the touch driving signal.

The shielding signal may be output from the touch driving circuit 120 and may be applied to the shielding structures (Shielding PTN). Alternatively, the shielding signal may be output from a driving circuit disposed separately from the touch driving circuit 120 and may be applied to the shielding structures (Shielding PTN).

When the shielding signal is output from the touch driving circuit 120, each the shielding structure PTN may be connected to the touch driving circuit 120 so as to be applied with the shielding signal from the touch driving circuit 120.

Alternatively, the shielding structures (Shielding PTN) may have a structure in which the shielding structures (Shielding PTN) are connected to each other in a pad portion that is an outer area of the touch display panel 110, and the shielding structures (Shielding PTN) and the touch driving circuit 120 may be connected through link lines LL disposed in the pad portion. Therefore, it is possible to apply a shielding signal to the shielding structures (Shield PTN) directly from the link lines that will reduce the number of separate wiring lines for supplying the shielding signal to the shielding structures (Shielding PTN). The link lines can be coupled to controlled by a separate processor that is outside the touch line driving circuit.

As described above, by providing shielding structures (Shielding PNT) between the touch lines TL and the data lines DL and applying a shielding signal corresponding to the touch driving signal to the shielding structures (Shielding PTN), it is possible to prevent noise from being generated in the touch sensing signal due to the capacitance due to the data lines DL.

Figure 15:
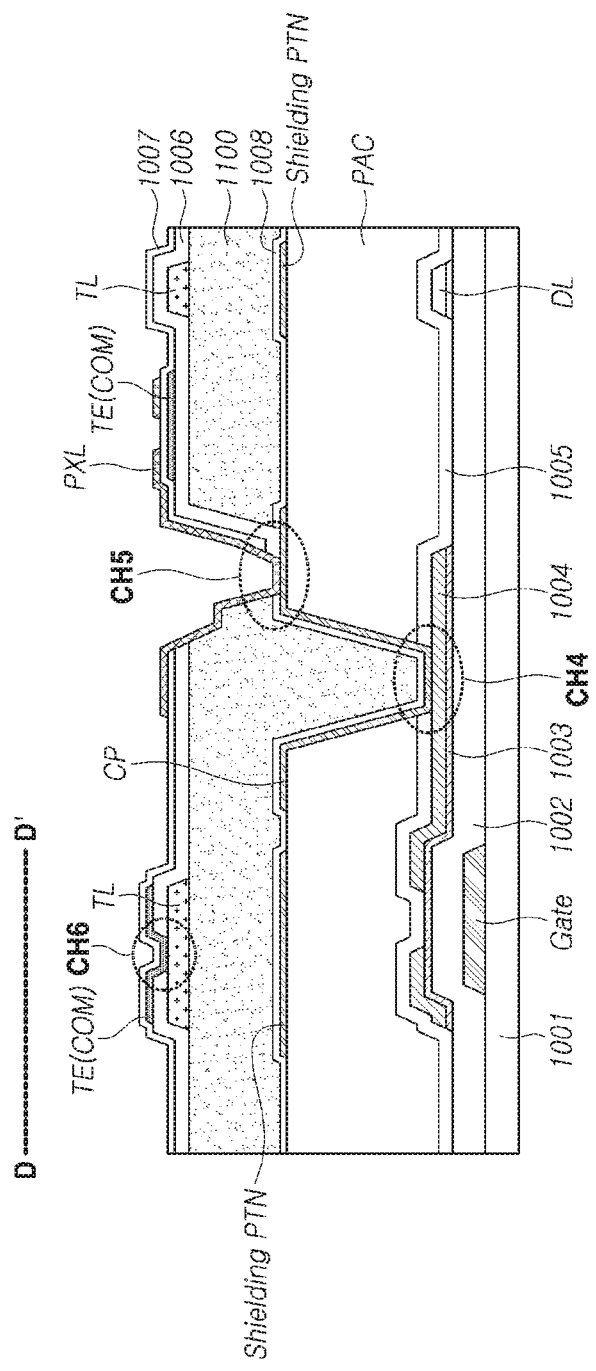
FIGS. 15 and 16 are views illustrating examples of cross-sectional structures of a portion D-D' and a portion E-E' in the touch display device illustrated in FIG. 14.
Figure 16:
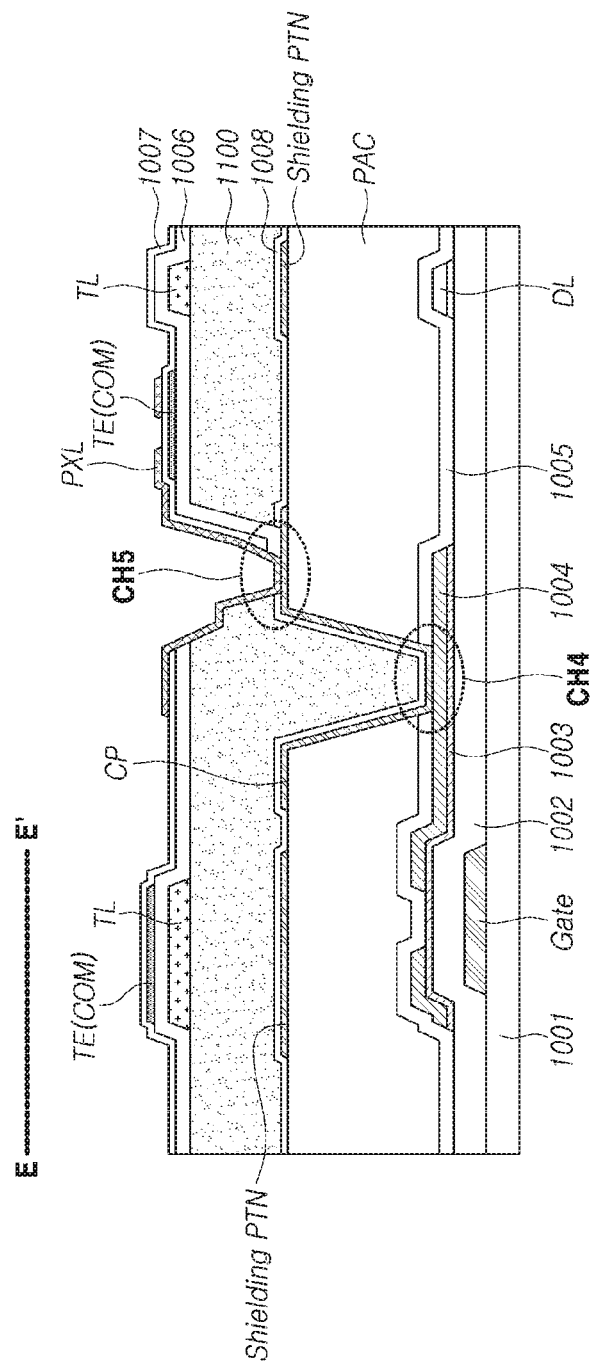

FIGS. 15 and 16 illustrate examples of a cross-sectional structure of the touch display device 100 illustrated in FIG. 14, in which FIG. 15 illustrates an example of a cross-sectional structure of a portion D-D' in FIG. 14 and FIG. 16 illustrates an example of a cross-sectional structure of a portion E-E' in FIG. 14.

Referring to FIGS. 15 and 16, a gate electrode (Gate) is disposed on a substrate 1001, and a gate insulating layer 1002 is disposed on the gate electrode (Gate). An active layer 1003, a source/drain electrode 1004, and a data line DL are disposed on the gate insulating layer 1002.

A first protective layer 1005 is disposed on the source/drain electrode 1004 and the data line DL and a planarization layer PAC is disposed on the first protective layer 1005. This protective layer 1005 is preferably an insulating layer.

A shielding structure (Shielding PTN) and a connection structure CP are disposed on the planarization layer PAC. Here, the shielding structure (Shielding PTN) may be arranged so as to overlap at least a portion of the data line DL. The connection structure CP may be connected to the source/drain electrode 1004 through the fourth contact hole CH4 formed in the planarization layer PAC.

A touch load reduction layer 1100 is disposed on the shielding structure (Shielding PTN) and the connection structure CP. Further, a fourth protective layer 1008 may be further disposed between the shielding structure (Shielding PTN) and the touch load reduction layer 1100.

The touch load reduction layer 1100 may be disposed to have a predetermined height, and the touch line TL may be disposed on the touch load reduction layer 1100. Accordingly, it is possible to reduce noise caused due to capacitance between the touch line TL and the data line DL disposed in the horizontal direction through the touch load reduction layer 1100.

A second protective layer 1006 may be disposed on the touch line TL and a touch electrode TE may be disposed on the second protective layer 1006. A third protective layer 1007 may be disposed on the touch electrode TE and a pixel electrode PXL may be disposed on the third protective layer 1007.

The pixel electrode PXL may be connected to the connection structure CP through a fifth contact hole CH5 disposed in the touch load reduction layer 1100. Thus, the pixel electrode PXL may be connected to the source/drain electrode 1004 through the connection structure CP.

The touch electrode TE may be connected to the touch line TL through a sixth contact hole CH6 disposed in the second protective layer 1006 as illustrated in FIG. 15 in a portion where the touch electrode TE is connected to the touch line TL. In addition, a portion where the touch electrode TE is not connected to the touch line TL may have the same structure as the example illustrated in FIG. 16.

Here, since the shielding structure (Shielding PTN) is applied with a shielding signal from the touch driving circuit 120 or a separately disposed driving circuit, the touch electrode TE may not be connected to the shielding structure (Shielding PTN). Accordingly, as illustrated in FIGS. 15 and 16, a contact hole for connecting the shielding PTN and the touch electrode TE may not be disposed.

In this manner, when the shielding structure (Shielding PTN) is configured to be applied with a shielding signal corresponding to a touch driving signal from the outside, the contact hole for connecting the shielding structure (Shielding PTN) and the touch electrode TE may be removed and the touch display device 100 in which the shielding structure (Shielding PTN) is disposed may be easily implemented.

According to the above-described embodiments of the present disclosure, it is possible to remove display noise of a touch sensing signal by arranging a shielding structure (Shielding PTN) between a touch line TL and a line to which a signal for display driving is applied.

In addition, it is also possible to remove noise caused by capacitance between a touch line TL and a data line DL arranged in the horizontal direction by arranging a touch load reduction layer 1100 between the shielding structure (Shielding Pattern) and the touch line TL. The touch load reduction layer 1100 can be an insulating layer. In one embodiment, the PAC is a first insulating layer disposed on the data line and the touch load reduction layer is a second insulating layer disposed on the touch electrode. A touch line is disposed on this second insulating layer, and overlapping the data line and the touch electrode.

The touch load reduction layer 1100 provides a greater distance between the data line DL and the touch line TL, therefore reducing the parasitic capacitive coupling between them. In the embodiment in which the shielding structure is driven with a signal different from the touch line drive signal, then a touch load reduction layer 1100 positioned between the shielding structure and the touch line also provides a greater distance between them and thus reduces the parasitic capacitance between them.

Further, by configuring the shielding structure (Shielding PTN) to be applied with a shielding signal corresponding to a touch driving signal from the outside, the shielding structure (Shielding PTN) can be arranged while minimizing the increase of the number of contact holes, it is possible to improve touch sensing performance.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

It is to be appreciated that certain features of the present disclosure which are, for clarity, described herein in the context of separate embodiments, may also be provided in combination in a single embodiment. Conversely, various features of the present disclosure that are, for brevity, described in the context of a single embodiment, may also be provided separately or in any subcombination.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
a touch electrode embedded in a touch display panel;
a touch line connected to the touch electrode;
a data line at least partially overlapping the touch line;
a pixel electrode coupled to the data line; and
an electrically conductive shielding structure vertically interposed between the touch line through which a touch driving signal is provided to the touch electrode and the data line within a region where the touch line and the data line overlap each other in a plan view,
wherein the shielding structure is electrically connected to the touch electrode,
wherein the shielding structure is disposed between the data line and the touch line, and the shielding structure at least partially overlaps both the data line and the touch line in a plan view,
wherein the data line is arranged in an identical direction to the touch line,
wherein the touch line includes a contact portion and a non-contact portion, and a width of the contact portion is wider than a width of the non-contact portion,
wherein the touch line is electrically connected to the touch electrode via a contact hole overlapping with the contact portion of the touch line.

2. The touch display device of claim 1 wherein the shielding structure is disposed in all regions where the data line and touch line overlap each other.

3. The touch display device of claim 1 wherein the shielding structure is disposed only in regions where the data line, touch electrode and touch line overlap each other.

4. The touch display device of claim 1 further including:
an insulating layer positioned between the touch electrode and the touch line, wherein the contact hole is in the insulating layer through which the touch line is connected to the touch electrode.

5. The touch display device of claim 1, wherein the shielding structure is connected to the touch electrode via at least one contact hole.

6. The touch display device of claim 1, wherein the one touch electrode is disposed on a layer different from the touch lines and the shielding structure, and
wherein the touch electrode is connected to the touch line via a first contact hole and is connected to the shielding structure via a second contact hole.

7. The touch display device of claim 1, further comprising:
an insulating layer overlying the data line; wherein the pixel electrode is disposed on the insulating layer,
wherein the shielding structure is disposed on the insulating layer and is spaced from and electrically insulated from the pixel electrode.

8. The touch display device of claim 1, further comprising:
an insulating layer overlying the data line, wherein the shielding structure and the touch electrode are disposed on the insulating layer.

9. A touch display device, comprising:
a data line;
a touch line located at least partially overlapping the data line, the touch line configured to be controlled by a touch driving signal, wherein the touch driving signal is applied for sensing presence and absence of a touch on the touch display device;
a touch electrode connected to the touch line;
an electrically conductive shielding structure vertically interposed between the data line and the touch line through which the touch sensing signal is provided to the touch electrode, vertically overlapping respective parts of the data line and the touch line in a plan view, and configured to be applied with a shielding signal; and
a touch load reduction layer disposed between the touch line and the shielding structure, the touch load reduction layer being an electrical insulator,
wherein the shielding structure is disposed between the data line and the touch line, and the shielding structure at least partially overlaps both the data line and the touch line in a plan view,
wherein the data line is arranged in an identical direction to the touch line,
wherein the touch line includes a contact portion and a non-contact portion, and a width of the contact portion is wider than a width of the non-contact portion,
wherein the touch line is electrically connected to the touch electrode via a contact hole overlapping with the contact portion of the touch line.

10. The touch display device of claim 9, wherein the shielding signal corresponds to the touch driving signal.

11. The touch display device of claim 10, further comprising:
a planarization layer disposed over the data line and below the touch load reduction layer.

12. The touch display device of claim 11, wherein the planarization layer is thicker than the touch load reduction layer.

13. The touch display device of claim 9, wherein the shielding structure is disposed so as to at least partially overlap at least a portion of each of the data line and the touch line.

14. The touch display device of claim 9, wherein the shielding structure is connected to the touch electrode via at least one contact hole disposed in the touch load reduction layer.

15. The touch display device of claim 9, wherein the shielding structure is insulated from the touch electrode and configured to receive the shielding signal from a circuit outside of the touch driving circuit.

16. The touch display device of claim 9, wherein the data line is configured to be applied with a data voltage modulated based on the touch driving signal for at least a portion of a period in which the touch driving signal is applied to the touch line.

17. The touch display device of claim 9, further comprising:
a pixel electrode insulated from the touch electrode; and
a connection structure located under the touch load reduction layer and configured to electrically connect the pixel electrode to a source/drain electrode of a transistor.

18. The touch display device of claim 17, wherein the connection structure and the shielding structure are made of the same material and layer, the connection structure being spaced from the shielding structure.

19. The touch display device of claim 9, further comprising:
   a pixel electrode disposed on the touch load reduction layer and electrically separated from the touch line.

20. The touch display device of claim 19, wherein the pixel electrode is disposed in a region spaced from a region where the touch electrode and the data line overlap each other.

* * * * *